US012486948B2

(12) United States Patent
Pursifull et al.

(10) Patent No.: US 12,486,948 B2
(45) Date of Patent: Dec. 2, 2025

(54) SYSTEM AND METHOD FOR DETECTING HYDROGEN TANK FILL OPERATION IN A FUEL CELL ELECTRIC VEHICLE

(71) Applicant: Ford Global Technologies, LLC, Dearborn, MI (US)

(72) Inventors: Ross Dykstra Pursifull, Dearborn, MI (US); Tobias Klaus Emig, Gelsenkirchen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 18/472,812

(22) Filed: Sep. 22, 2023

(65) Prior Publication Data

US 2025/0102111 A1 Mar. 27, 2025

(51) Int. Cl.
*F17C 5/00* (2006.01)

(52) U.S. Cl.
CPC ...... *F17C 5/007* (2013.01); *F17C 2205/0326* (2013.01); *F17C 2221/012* (2013.01); *F17C 2250/032* (2013.01); *F17C 2250/0434* (2013.01); *F17C 2250/0439* (2013.01); *F17C 2250/07* (2013.01); *F17C 2270/0184* (2013.01)

(58) Field of Classification Search
CPC .............. F17C 5/007; F17C 2205/0326; F17C 2221/012; F17C 2250/032; F17C 2250/0434; F17C 2250/0439; F17C 2250/07; F17C 2270/0184
USPC .......................................................... 141/98
See application file for complete search history.

(56) References Cited

U.S. PATENT DOCUMENTS

| | | | |
|---|---|---|---|
| 6,159,626 A | 12/2000 | Keskula et al. | |
| 7,350,604 B2 | 4/2008 | Veenstra et al. | |
| 8,795,917 B2 * | 8/2014 | Yoshida ............ | H01M 8/04432 429/513 |
| 9,083,018 B2 | 7/2015 | Makino et al. | |
| 10,167,999 B2 | 1/2019 | Handa | |
| 10,962,994 B2 * | 3/2021 | Jeon ........................ | F16K 1/305 |
| 2014/0295306 A1 * | 10/2014 | Kikuchi .................. | B60L 58/33 429/429 |
| 2018/0294496 A1 * | 10/2018 | Takeda .............. | H01M 8/04373 |
| 2021/0070164 A1 * | 3/2021 | Veenstra ............... | F17C 13/026 |

FOREIGN PATENT DOCUMENTS

JP 2014126149 A 7/2014

* cited by examiner

*Primary Examiner* — Craig M Schneider
*Assistant Examiner* — Christopher M Afful
(74) *Attorney, Agent, or Firm* — David B. Kelley; Brooks Kushman, P.C.

(57) ABSTRACT

A fuel system includes a controller and a fuel delivery system having a fuel line. The fuel delivery system is fluidly coupled to a fuel tank. The fuel line defines an inlet and is adapted to extend between the inlet and the fuel tank to transport the fuel. The one or more sensor devices are configured to provide data indicative of a characteristic of the fuel. The controller is configured to detect a characteristic differential between the inlet and the fuel tank based on data from the one or more sensor devices to identify occurrence of a fill operation, and control the fuel delivery system for the fill operation in response to detecting the characteristic differential identifying occurrence of the fill operation.

17 Claims, 3 Drawing Sheets

SYSTEM AND METHOD FOR DETECTING HYDROGEN TANK FILL OPERATION IN A FUEL CELL ELECTRIC VEHICLE

STATEMENT REGARDING GOVERNMENT SPONSORED RESEARCH OR DEVELOPMENT

This invention was made with Government support under Contract No. DE-EE0009858 awarded by the Department of Energy. The government has certain rights in the invention.

TECHNICAL FIELD

The present disclosure relates to methods and systems for controlling a fill operation of a fuel cell electric vehicle (FCEV).

BACKGROUND

A fuel cell is an electrochemical device that converts chemical energy of a fuel (e.g., hydrogen) and an oxidizing agent (e.g., oxygen) into electrical energy, with water as a byproduct. A fuel cell stack is a connected group of fuel cells. A fuel cell system including one or more fuel cell stacks may be used in a FCEV to provide electrical power for FCEV propulsion.

SUMMARY

In one form, the present disclosure is directed to a fuel system for a fuel cell electric vehicle (FCEV). The fuel system includes a controller and a fuel delivery system having a fuel line. The fuel delivery system is fluidly coupled to a fuel tank. The fuel line defines an inlet and is adapted to extend between the inlet and the fuel tank to transport the fuel. The one or more sensor devices are configured to provide data indicative of a characteristic of the fuel. The controller is configured to control the fuel delivery system for a fill operation in response to detecting a characteristic differential between the inlet and the fuel tank based on the data indicating occurrence of the fill operation.

In one form, the present disclosure is directed to a method for providing fuel to a fuel cell electric vehicle (FCEV) via a fuel system of the FCEV. The method including obtaining data indicative of a characteristic of the fuel in a fuel line of a fuel delivery system of the fuel system from one or more sensors arranged at the fuel system; and controlling the fuel delivery system for a fill operation in response to detecting a pressure differential between an inlet and a fuel tank based on data from the one or more sensors to have the fuel provided to the fuel tank.

In one form, the present disclosure is directed to a fuel system for a fuel cell electric vehicle (FCEV). The fuel system includes a fuel delivery system that is fluidly coupled to a fuel tank, and the fuel delivery system includes a fuel line defining an inlet and adapted to extend between the inlet and the fuel tank to transport fuel, and one or more sensors configured to provide data indicative of a characteristic of the fuel. The system further includes a controller configured to detect a characteristic differential between the inlet and the fuel tank based on data from the one or more sensors to identify occurrence of a fill operation, where the characteristic differential is at least one of a pressure differential or a temperature differential, and control the fuel delivery system for the fill operation in response to detecting the pressure differential to direct the fuel to the fuel tank and to inhibit operation of a fuel cell.

DETAILED DESCRIPTION

As required, detailed embodiments of the present disclosure are provided herein; however, it is to be understood that the disclosed embodiments are merely exemplary. The figures are not necessarily to scale; some features may be exaggerated or minimized to show details of particular components. Therefore, specific structural and functional details disclosed herein are not to be interpreted as limiting the present disclosure, application, or uses.

Filling operations for providing high pressured hydrogen fuel to a FCEV may require ceasing certain operations of the FCEV such as, but not limited to, stopping operation of a fuel cell system of the FCEV. In some application, the FCEV may be provided with a fuel tank door to be opened by a user prior to fueling, and may be used to indicate when a fill operation for filling a tank of the FCEV is about to occur. However, the fuel tank door is an additional component that adds a layer of complexity to the FCEV. For example, the fuel tank door may be prone to wear, may be left open, may not open due to an atypical switch, and may need a controller of the FCEV to wake up.

The present disclosure is directed to a system and/or method for detecting a fill operation based a characteristic differential indicating a change in one or more selected characteristics in a fuel delivery system of the FCEV. In one form, the characteristic(s) may be related to temperature, pressure, or both temperature and pressure. Once detecting the occurrence of the fill operation, the fuel delivery system is controlled to stop providing fuel from the fuel tank and stop fuel from being injected to the fuel cell system (i.e., shuts-down fuel cells of the fuel cell system) and directing the fuel from a fuel nozzle to the fuel tank via a designated path.

The method/system of the present disclosure detects the fill operation without the need of a fuel tank door and/or and other user operated fuel event trigger, and provides the system in a state for receiving fuel. In addition, the technique described herein is compatible with a FCEV being powered during fueling and a FCEV being un-powered during fueling (i.e., the FCEV does not have to be powered up to fuel).

Details regarding the method/system of the present disclosure is now described with reference to the figures.

Figure 1:
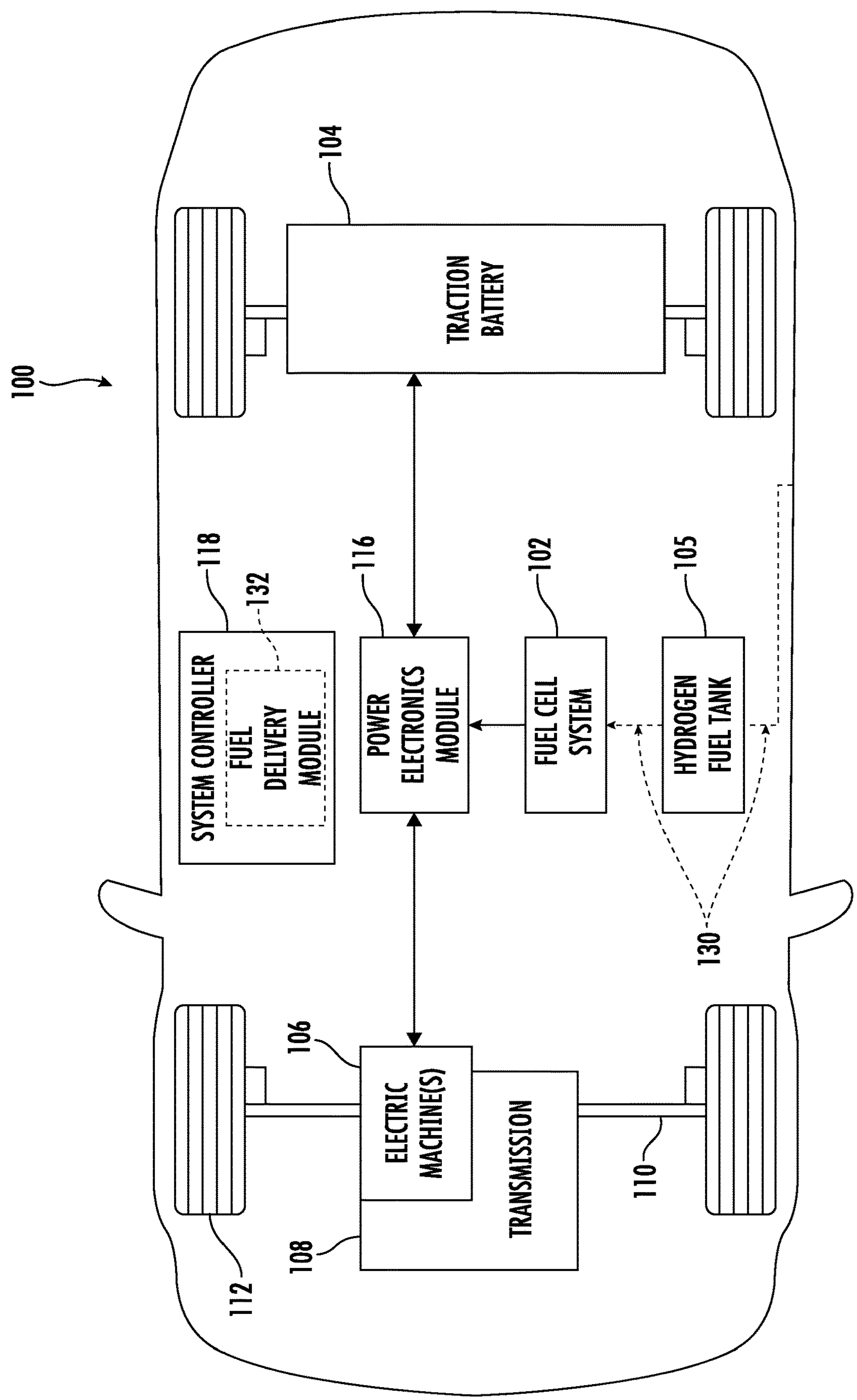
FIG. 1 illustrates a block diagram of an example fuel cell electric vehicle (FCEV) having a fuel cell system (FCS) in accordance with the present disclosure.

Referring now to FIG. 1, a block diagram of an example fuel cell electric vehicle (FCEV) 100 having a fuel cell system (FCS) 102 and a traction battery 104 is shown. The FCS 102 and the traction battery 104 are individually operable for providing electrical power for propulsion of the FCEV 100.

In one form, the FCS 102 includes one or more fuel cell stacks (not shown). Each fuel cell stack is comprised of a plurality of fuel cells (e.g., proton-exchange membrane fuel cells) electrically connected (usually) in series. In operation, hydrogen from a fuel tank 105 is injected into the fuel cell stack causing a chemical reaction within the fuel cell stack that further generates electrical power. In one form, the fuel tank 105 is adapted to store high pressure hydrogen.

The FCEV 100 further includes one or more electric machines 106 mechanically connected to a transmission 108. The transmission 108 is mechanically connected to a drive shaft 110 that is further mechanically connected to wheels 112 of the FCEV 100.

In one form, the electric machine 106 is capable of operating as a motor and as a generator. That is, as a motor, the electric machine 106 to propel and/or slow the FCEV 100, and as a generator, the electric machine 106 is operable to recover energy that may normally be lost as heat in a friction braking system (not shown).

More particularly, the FCS 102 is operable to convert hydrogen to electrical power for powering the electric machine 114 and, thus, propelling the FCEV 100. In one form, the FCS 102 is electrically connected to the electric machine 106 via a power electronics module 116 of the FCEV 100. Among other components, the power electronics module 116 may include an inverter to transfer electrical power from the FCS 102 into electrical power having a form compatible for operating electric machine 106. For example, the FCS 102 may provide high-voltage (HV) direct current (DC) electrical power while the electric machine 106 may use three-phase alternating current (AC) electrical power to operate. In this way, FCEV 100 is configured to be propelled with use of electrical power from FCS 102.

The traction battery 104 is configured to store electrical energy for use by the electric machine 106 for propelling FCEV 100. The traction battery 104 is also electrically connected to electric machine 106 via the power electronics module 116. The power electronics module 116 provides the ability to bi-directionally transfer electrical power between the traction battery 104 and the electric machine 106. Further, in a regenerative mode, the power electronics module 116 converts AC electrical power from electric machine 106, acting as a generator, to the DC electrical power form compatible with the traction battery 104.

Similarly, the traction battery 104 may receive electrical power from FCS 102 via the power electronics module 116. For instance, when FCS 102 provides electrical power for propelling FCEV 100, any excess electrical power from the FCS not used in propelling the FCEV may be received by the traction battery 104 via power electronics module 116.

The FCS 102 and the traction battery 104 may have one or more associated controllers to control and monitor the operation thereof. The controllers can be microprocessor-based devices. The controllers may communicate via a serial bus (e.g., controller area network (CAN)) or via discrete conductors.

With the fuel tank 105, the FCEV 100 further includes a fuel delivery system 130 illustrated as dashed lines in FIG. 1. The fuel delivery system 130 is configured to deliver fuel from a source (not shown) to the fuel tank 105, and may further be configured to deliver fuel from the fuel tank 105 to the FCS 102. Operation of the fuel delivery system 130 is controllable by the system controller 118, and more specifically, a fuel delivery module 132 of the controller 118. In one form, the fuel tank 105, the fuel delivery system 130, and aspects of the system controller 118 such as the fuel delivery module 130 form part of a fuel system of the FCEV 100.

Figure 2:
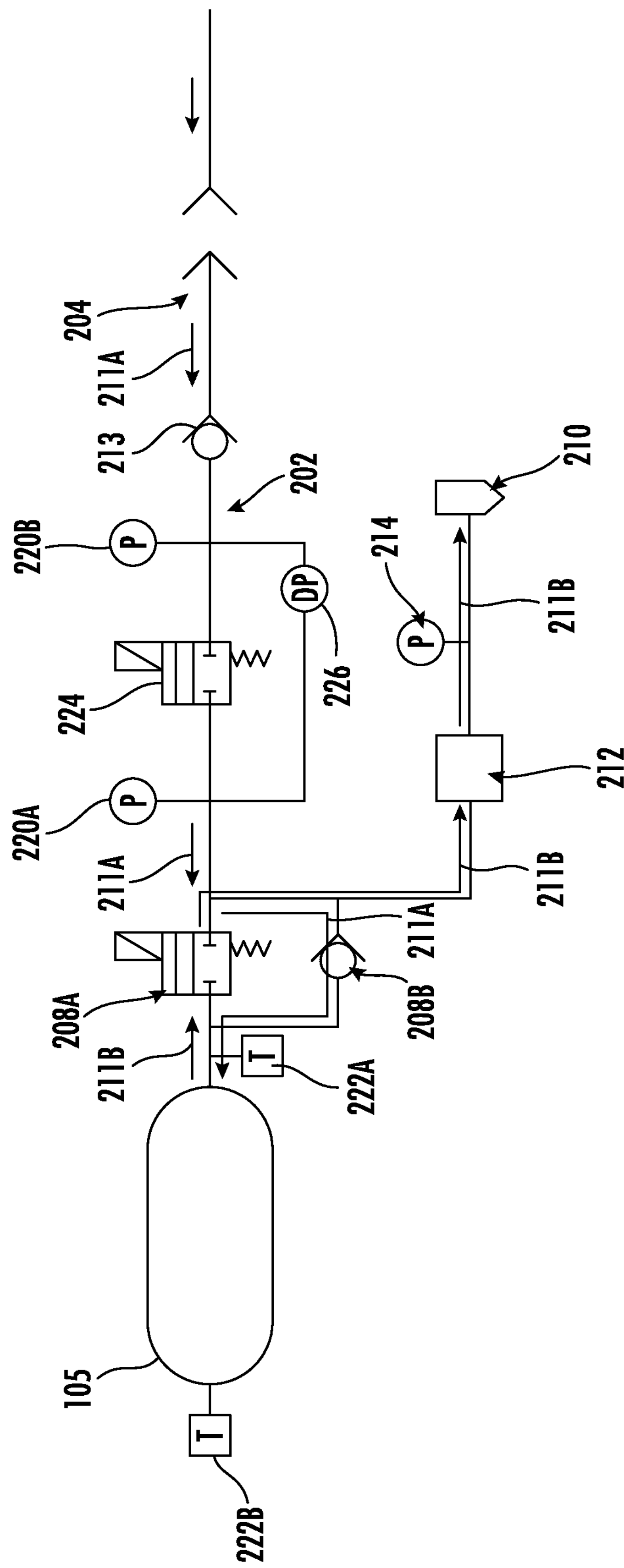
FIG. 2 illustrate a fuel deliver system of the FCEV of FIG. 1 in accordance with the present disclosure.

Referring to FIG. 2, an example of the fuel delivery system 130 is provided and includes a fuel line 202 having an inlet 204, a set of tank valves 208A, 208B (collectively "set of tank valves 208"), and an injector 210. The fuel line 202 is adapted to provide a flow path for the hydrogen fuel from the inlet 204, to the tank 105, and further to the injector 210 that provides the hydrogen fuel to the fuel cells of the FCS 102. The fuel line 202 may be formed of one or more conduits connected together to provide the flow path.

While the fuel delivery system 130 is illustrated as having one tank 105 and one injector 210, the fuel delivery system 130 may include one or more tanks 205 and/or injectors 210.

In one form, the inlet 204, which may also be referred to as a receptacle, is adapted to receive a fuel nozzle at a fuel station during a fill operation. To inhibit fuel from traveling back to the fuel nozzle, the fuel line 202 may include an inlet check valve 213 arranged downstream of the inlet 204.

The set of tank valves 208 controls the flow of fuel to and from the fuel tank 105, and in one form, includes a tank valve 208A and a tank check valve 208B. The tank valve 208A is arranged between the tank 105 and the injector 210 to control the flow of fuel from the tank 205 to the injector 210. More specifically, the set of tank valves 208 are controlled to have fuel enter the tank 105 via the tank check valve 208B during the fill operation and to have fuel leave the tank 105 via the tank valve 208A when fuel is being provided to the injector 210. For example, in FIG. 2, arrows indicate a desired flow path 211A of fuel during the fill operation and a desired flow path 211B of fuel being provided to the injector 210. It should be readily understood that the desired flow paths 211A and 211B may be defined in various suitable ways and should not be limited to the disclosure.

In a non-limiting example, the tank valve 208A is provided as a solenoid valve and, during the fill operation, is provided in a closed state to have fuel enter the tank 105 via the tank check valve 208B. While the set of tank valves 208 is illustrated as having two valves, the set of tank valves may include one or more valves 208.

In one form, fuel being provided to the injector 210 passes a pressure regulator 212 prior to being injected by the injector 210. The pressure regulator 212 is operable to adjust the pressure of the fuel to a desired pressure level prior to being discharged by the injector 210. In some applications, an output fuel pressure sensor 214 is provided between the pressure regulator 212 and the injector 210 to detect an output pressure value of the fuel, which may be provided to the controller 118 to monitor fuel pressure and adjust the pressure via the pressure regulator 212 if needed (e.g., the output pressure value is below or higher than the desired pressure level).

In one form, the fuel delivery system 130 further includes various sensor devices (i.e., sensors) for measuring different characteristics related to the fuel provided in the system 130, such as but not limited to, pressure and/or temperature. More particularly, in one form, the fuel delivery system 130 includes one or more pressures sensors, such as a tank line pressure sensor 220A and a fill line pressure sensor 220B (i.e., collectively "pressure sensors 220"), and one or more tank temperature sensors, such as a tank inlet temperature sensor 222A and a tank end temperature sensor 222B (i.e., collectively "temperature sensors 222") arranged opposite of the tank inlet temperature sensor 222A. The sensor devices are configured to provide respective data to the controller 118, which in return controls operation of the fuel delivery system 130, among other features of the FCEV 100, such as the FCS 102.

The tank line pressure sensor 220A is arranged between the tank 105 and the inlet 204 to measure a pressure of fuel entering or exiting the tank 105. The fill line pressure sensor

220B is arranged between the inlet check valve 213 and the tank pressure sensor 220A, and is arranged closer to the inlet check valve 213 to monitor pressure of fuel entering via the inlet 204. As described herein, among other system checks conducted by the controller 188, the pressure values from the tank line pressure sensor 220A and the fill line pressure sensor 220B are employed to detect the fill operation of the tank 105.

Temperatures sensors 222 are provided to monitor the temperature of the fuel entering/leaving the tank 105 and the temperature of the fuel within the tank 105. In some applications, the tank end temperature sensor 22B is provided with a thermally activated pressure relief device (not shown) that releases the fuel (i.e., hydrogen) when the temperature reaches a defined limit.

In one form, the fuel delivery module 132, as part of the system controller 118, is configured to detect the fill operation in which fuel is delivered to the fuel tank based on data from the one or more sensor devices, and more specifically, on a characteristic differential indicating a change in one or more selected characteristics in the fuel delivery system 130. Once detected, the fuel delivery module is configured to control the fuel delivery system for the fill operation, by for example, closing the tank valve 208A and, thus, ceasing injection of fuel by the injector 210 to the fuel cell.

In some applications, the characteristic differential may be indicative of a pressure differential provided between the inlet 204 and the fuel tank 105 and/or a temperature differential provided in the fuel tank 105.

The pressure differential may be detected using one or more of the following methods. In one variation, the fuel delivery module 132 is configured to determine whether the pressure detected by the fill line pressure sensor 220B is greater than the pressure detected by the tank pressure sensor 220A. Stated differently, the fuel delivery module 132 compares the pressure at a portion of the fuel line closest to the tank 105 (i.e., a first portion) with the pressure at a portion of the fuel line closest to the inlet 204 (i.e., second portion). If the pressure is greater near the inlet 204, than the fuel delivery module 132 determines that the fill operation is being performed and controls the system 130 accordingly. That is, fuel entering the fuel line from the nozzle of fuel pump has a higher pressure than fuel provided near the tank valve 208A causing the pressure differential. If the pressure at the first portion of the fuel line is greater than the pressure at the second portion, than the fuel delivery module 132 determines that there is no fill operation.

In another variation, if the fill line pressure sensor 220B is not provided, the fuel deliver module 132 may detect the pressure differential based on data from the tank pressure sensor 220A. Specifically, the fuel delivery module 132 is configured to monitor the pressure at the first portion of the fuel line, and detect the pressure differential when the pressure increases at an identified rate. In a non-limiting example, the fuel delivery module 132 may temporarily save data from the pressure sensor 220A to monitor the pressure at the respective portion of the fuel line 202. Based on the microprocessor employed by the controller 118 and response time of the sensor 220A, the fuel delivery module 132 may detect an increase in pressure within defined time interval (e.g. milli seconds) of the start of the fill operation. The rate of increase (i.e., identified rate) can be determined via, for example, testing and/or simulation.

In another variation, if the FCEV 100 includes a fill prevention valve 224, a delta pressure sensor 226 may be used to detect a pressure differential across the fill prevention valve 224 to determine if there is a fill operation. In a non-limiting example, the fill prevention valve 224 is arranged between the inlet 204 and the tank valve 208A and is operable by the controller 118 to be inhibit fuel from flowing to/from the tank 105 when closed, and during the fill operation is operable in an open position to allow fuel to travel to the tank 105.

The delta pressure sensor 226 is configured to measure delta or difference of pressure across the valve 224. Stated differently, in lieu of or in addition to sensors 220A, 220B, the delta pressure sensor is provided to detect a pressure differential between a first side of the valve 224 that is closest to the inlet 204 with a second side of the valve 224 that is closest to the tank valve 208A. Accordingly, with the fill prevention valve 224 being closed, the delta pressure sensor 226 detects a pressure gradient or increase pressure on the first side of the valve 224 (i.e., forward bias pressure) during the fill operation. The delta pressure sensor 226 may transmit data regarding the pressure differential to the fuel delivery module 132, which in return may open the fill prevention valve 224 as part of the fill operation.

In another variation, pressure data may be virtually detected. Specifically, with the tank valve 208A open, the pressure of the tank 105 is determined using the pressure measurement from the pressure sensor 220A. With the temperature of the tank 105 from the temperature sensor 222B and the pressure from the pressure sensor 22A the controller 118 determines a density of the tank, which can be monitored and stored, using known algorithms/techniques. With the most recent density, the controller 118 with the fuel delivery module 132 is able detect a virtual tank pressure after the tank valve 208A is closed using the density and most recent temperature of the tank 105 from the temperature sensor 222B. With the virtual tank pressure and a current/recent pressure measurement from the pressure sensor 220A, the fuel delivery module 132 is configured to determine if the pressure from the pressure sensor 220A is higher than that of the virtual tank pressure. If the virtual tank pressure is lower, the fuel delivery module 132 detects the fill operation and controls the system 130 accordingly. Thus, the controller 118 is able to detect the fill operation without adding a sensor device, such as an additional pressure sensor.

With the characteristic differential being a temperature differential, the temperatures provided by the temperatures sensors 222 may be employed to detect the fill operation. Specifically, when the fill operation beings, the tank inlet temperature sensor 222A provides a lower temperature than that of the tank end temperature sensor 222B due to the fuel being provided via the check valve. This change in temperature can be detected within milliseconds of the fill operation based on a processing time of the temperature sensors 222 and the controller 118. Once detected, the controller 118 may determine the fill operation is occurring and controls the system 130 accordingly.

Figure 3:
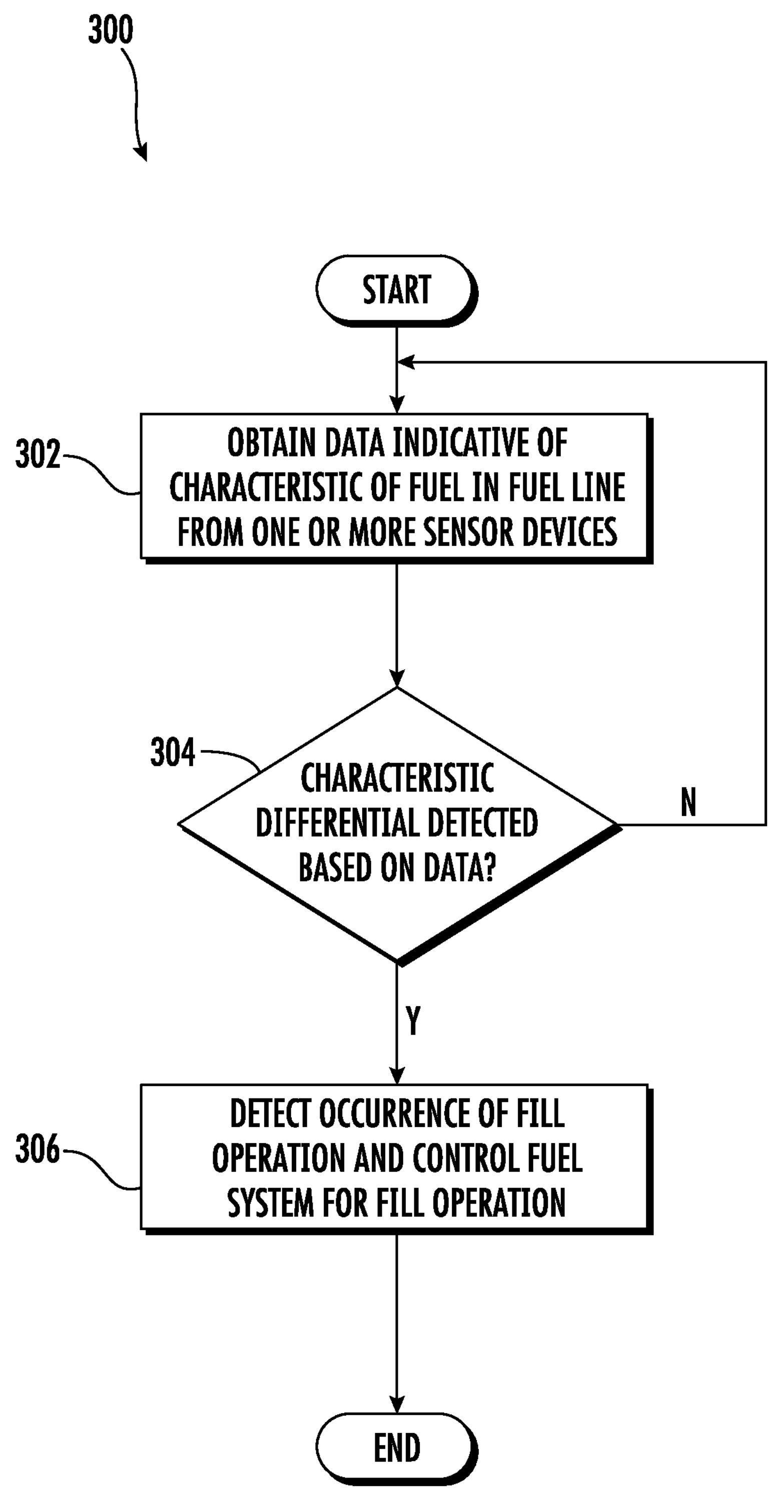
FIG. 3 is a flowchart of a fuel fill operation routine in accordance with the present disclosure.

Referring to FIG. 3, an example fuel fill operation routine 300 executed by the fuel delivery module 132 of the system controller 118 is provided. At operation 302, the system control 118 obtains data indicative of characteristic of fuel in fuel line from one or more sensor devices. The data may be indicative of pressure at one or more portions of the fuel line 202 and/or temperature at the tank 105. At 304, the system controller 118 determines whether a characteristic differential is detected based on the data. The characteristic differential may be a differential in pressure and/or a differential in temperature at the tank, where the differential is indicative of the fill operation. Using one or more of the techniques described in the present disclosure, the system controller 118 detects the characteristic differential using at least one of a pressure differential or a temperature differential. If the characteristic differential is detected, the system control 118, at operation 306, determines that the fill operation is occurring and controls the fuel delivery system for the fill operation. As detailed above, the controller 118 may operate the tank valve 208A and, if provided, the fill prevention valve 224 to have the fuel flow to the tank 105 and to inhibit operation of the fuel cell.

Unless otherwise expressly indicated herein, all numerical values indicating mechanical/thermal properties, compositional percentages, dimensions and/or tolerances, or other characteristics are to be understood as modified by the word “about” or “approximately” in describing the scope of the present disclosure. This modification is desired for various reasons including industrial practice, material, manufacturing, and assembly tolerances, and testing capability.

In this application, the term “controller” and/or “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

As used herein, the phrase at least one of A, B, and C should be construed to mean a logical (A OR B OR C), using a non-exclusive logical OR, and should not be construed to mean “at least one of A, at least one of B, and at least one of C.”

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A fuel system for a fuel cell electric vehicle (FCEV), comprising:

a fuel delivery system fluidly coupled to a fuel tank, including:

a fuel line defining an inlet and adapted to extend between the inlet and the fuel tank to transport fuel, and one or more sensors configured to provide data indicative of a characteristic of the fuel, the one or more sensors include:

a first pressure sensor configured to detect a pressure at a first portion of the fuel line, and a second pressure sensor configured to detect a pressure at a second portion of the fuel line, wherein the second pressure sensor is provided closer to the inlet than the first pressure sensor; and a controller configured to control the fuel delivery system for a fill operation in response to detecting a characteristic differential between the inlet and the fuel tank based on the data indicating occurrence of the fill operation, wherein the controller is configured to detect a pressure differential as the characteristic differential responsive to the pressure at the second portion of the fuel line being greater than the pressure at the first portion of the fuel line.

2. The fuel system of claim 1, wherein the fuel delivery system further includes a fill valve arranged between the inlet and the fuel tank.

3. The fuel system of claim 2, wherein:

the one or more sensors include a delta pressure sensor to measure a delta pressure across the fill valve, and the controller is further configured to detect a second pressure differential as the characteristic differential responsive to the delta pressure sensor detecting a forward bias pressure and, for the fill operation, to operate the fill valve to an open position to have the fuel flow through the fill valve to the fuel tank.

4. The fuel system of claim 1, wherein the controller is further configured to:

monitor the pressure at the first portion of the fuel line, and detect a second pressure differential as the characteristic differential by detecting an increase in the pressure at the first portion at an identified rate.

5. The fuel system of claim 1, wherein:

the fuel delivery system further includes a tank valve operable to direct the fuel to an injector or to the fuel tank, and the controller, for the fill operation, is configured to control the tank valve to direct the fuel to the fuel tank.

6. The fuel system of claim 1, wherein:

the one or more sensors include;

a temperature sensor arranged at the fuel tank and configured to detect a temperature at the fuel tank; and the controller is further configured to:

detect a virtual tank pressure based on at least one of the pressure at the first portion or the pressure at the second portion, the temperature at the fuel tank, and a density of the fuel tank, and detect a second pressure differential as the characteristic differential based on the virtual tank pressure and a recent pressure detected by at least one of the first or second pressure sensors, wherein the second pressure differential is detected in response to the recent pressure being higher than that of the virtual tank pressure.

7. The fuel system of claim 1, wherein:

the fuel delivery system further includes an injector adapted to inject the fuel to a fuel cell, and the controller, for the fill operation, is configured to control the injector to cease injection of the fuel to the fuel cell.

8. The fuel system of claim 1, wherein:

the one or more sensors include:

a first temperature sensor configured to detect a first temperature at a first area of the fuel tank, and a second temperature sensor configured to detect a second temperature at a second area of the fuel tank opposite the first area, and the controller is further configured to detect a temperature differential as the characteristic differential responsive to the first temperature at the first area of the fuel tank being higher than the second temperature at the second area of the fuel tank.

9. A method for providing fuel to a fuel cell electric vehicle (FCEV) via a fuel system of the FCEV, the method comprising:

obtaining data indicative of a characteristic of the fuel in a fuel line of a fuel delivery system of the fuel system from one or more sensors arranged at the fuel system, wherein the data obtained is indicative of a pressure at a first portion of the fuel line being less than a pressure at a second portion of the fuel line, wherein the second portion of the fuel line is closer to an inlet of the fuel delivery system than the first portion; and controlling the fuel delivery system for a fill operation in response to detecting a pressure differential between the inlet and a fuel tank based on data from the one or more sensors to have the fuel provided to the fuel tank.

10. The method of claim 9, wherein:

the fuel delivery system further includes a tank valve and a fill valve, wherein the tank valve and the fill valve are arranged between the inlet and the fuel tank with the fill valve being closer to the inlet than the fuel tank, and the method further comprises:

measuring a delta pressure across the fill valve using a delta pressure sensor; and detecting a forward bias pressure using the delta pressure sensor to detect the pressure differential.

11. The method of claim 9, wherein:

the data is indicative of a pressure at a first portion of the fuel line, and the method further comprises:

monitoring the pressure at the first portion of the fuel line; and detecting the pressure differential when the pressure at the first portion increases at an identified rate.

12. The method of claim 9, further comprises, for the fill operation, controlling a tank valve to direct the fuel to the fuel tank.

13. The method of claim 9, wherein:

the data is indicative of a first pressure of the fuel at a portion of the fuel line associated with the fuel tank, and a temperature at the fuel tank, and the method further comprises detecting a virtual tank pressure based on the first pressure, the temperature at the fuel tank, and a density of the fuel tank, wherein the pressure differential is detected based on the virtual tank pressure and a recent value of the first pressure.

14. The method of claim 9, further comprises, for the fill operation, ceasing injection of the fuel to a fuel cell.

15. A fuel system for a fuel cell electric vehicle (FCEV), comprising:

a fuel delivery system fluidly coupled to a fuel tank, the fuel delivery system including:

a tank valve, a fill valve, a fuel line defining an inlet and adapted to extend between the inlet and the fuel tank to transport fuel, wherein the tank valve and the fill valve are arranged between the inlet and the fuel tank with the fill valve being closer to the inlet than the fuel tank, and one or more sensors configured to provide data indicative of a characteristic of the fuel, the one or more sensors including a delta pressure sensor to measure a delta pressure across the fill valve; and a controller configured to:

identify occurrence of a fill operation in response to detecting a characteristic differential between the inlet and the fuel tank based on data from the one or more sensors, wherein the characteristic differential is at least one of a pressure differential or a temperature differential, identify that the delta pressure sensor detects a forward bias pressure to detect the pressure differential, and control the fuel delivery system for the fill operation in response to detecting the pressure differential to direct the fuel to the fuel tank and to inhibit operation of a fuel cell, wherein, to control the fuel delivery system for the fill operation, the controller is configured to operate the fill valve to an open position to have the fuel flow through the fill valve to the fuel tank.

16. The fuel system of claim 15, wherein:

the one or more sensors include:

a first pressure sensor configured to detect a pressure at a first portion of the fuel line, and a second pressure sensor configured to detect a pressure at a second portion of the fuel line, wherein the second pressure sensor is provided closer to the inlet than the first pressure sensor, and the controller is further configured to determine that the pressure at the second portion of the fuel line is greater than the pressure at the first portion of the fuel line to detect the pressure differential.

17. The fuel system of claim 15, wherein:

the one or more sensors include:

a first temperature sensor configured to detect a first temperature at a first area of the fuel tank, and a second temperature sensor configured to detect a second temperature at a second area of the fuel tank opposite the first area, and the controller is further configured to detect the temperature differential as the characteristic differential responsive to the first temperature at the first area of the fuel tank being higher than the second temperature at the second area of the fuel tank.

* * * * *